United States Patent
Lucand et al.

(10) Patent No.: US 6,622,468 B2
(45) Date of Patent: Sep. 23, 2003

(54) BALING CHAMBER ARRANGEMENT OF A LARGE ROUND BALER DESIGNED FOR QUICK BALE DISCHARGE

(75) Inventors: Philippe Lucand, Melin (FR); Jean Viaud, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/021,579

(22) Filed: Dec. 17, 2001

(65) Prior Publication Data

US 2002/0073678 A1 Jun. 20, 2002

(30) Foreign Application Priority Data

Dec. 18, 2000 (DE) .......................................... 100 63 122

(51) Int. Cl.⁷ ............................................... A01D 39/00
(52) U.S. Cl. ........................................... 56/341; 100/88
(58) Field of Search ...................... 56/341, 342; 100/88, 100/89, 87, 77, 5

(56) References Cited

U.S. PATENT DOCUMENTS

| | | | |
|---|---|---|---|
| 4,159,615 A | 7/1979 | Eggers et al. ................ 56/341 |
| 4,319,446 A | 3/1982 | Arnold et al. ................ 56/341 |
| 4,534,285 A | * 8/1985 | Underhill ..................... 100/88 |
| 5,134,839 A | 8/1992 | Clostermeyer et al. ....... 56/341 |
| 5,875,709 A | * 3/1999 | Tertilt .......................... 100/89 |
| 6,094,900 A | 8/2000 | Underhill et al. ............. 56/341 |
| 6,101,933 A | * 8/2000 | Esken .......................... 100/89 |

FOREIGN PATENT DOCUMENTS

| | | |
|---|---|---|
| DE | 41 05 078 A1 | 8/1992 |
| DE | 43 08 646 A1 | 9/1994 |
| EP | 0 894 428 | 2/1999 |
| EP | 0 970 598 | 1/2000 |
| FR | 2 663 191 | 12/1991 |

* cited by examiner

*Primary Examiner*—Robert E. Pezzuto

(57) ABSTRACT

A baling chamber for a large round baler includes a discharge gate having opposite side walls which meet respective side walls of the main frame along a line of separation that inclines downwardly and to the rear from top to bottom. The bottom of the baling chamber is defined in part by a bottom conveyor which slopes downward to the rear from a front end which delimits a lower side of an inlet through which crop is fed into the baling chamber. The discharge gate carries a lower front roll that supports an endless tension element arrangement and that is itself supported on a tensioning arm arrangement that pivoted to the discharge gate for movement against the resistance of a yieldable spring arrangement so as to permit the lower front roll to move rearwardly from a first position adjacent the inlet, which it occupies at the beginning of bale formation, as the bale grows.

14 Claims, 3 Drawing Sheets

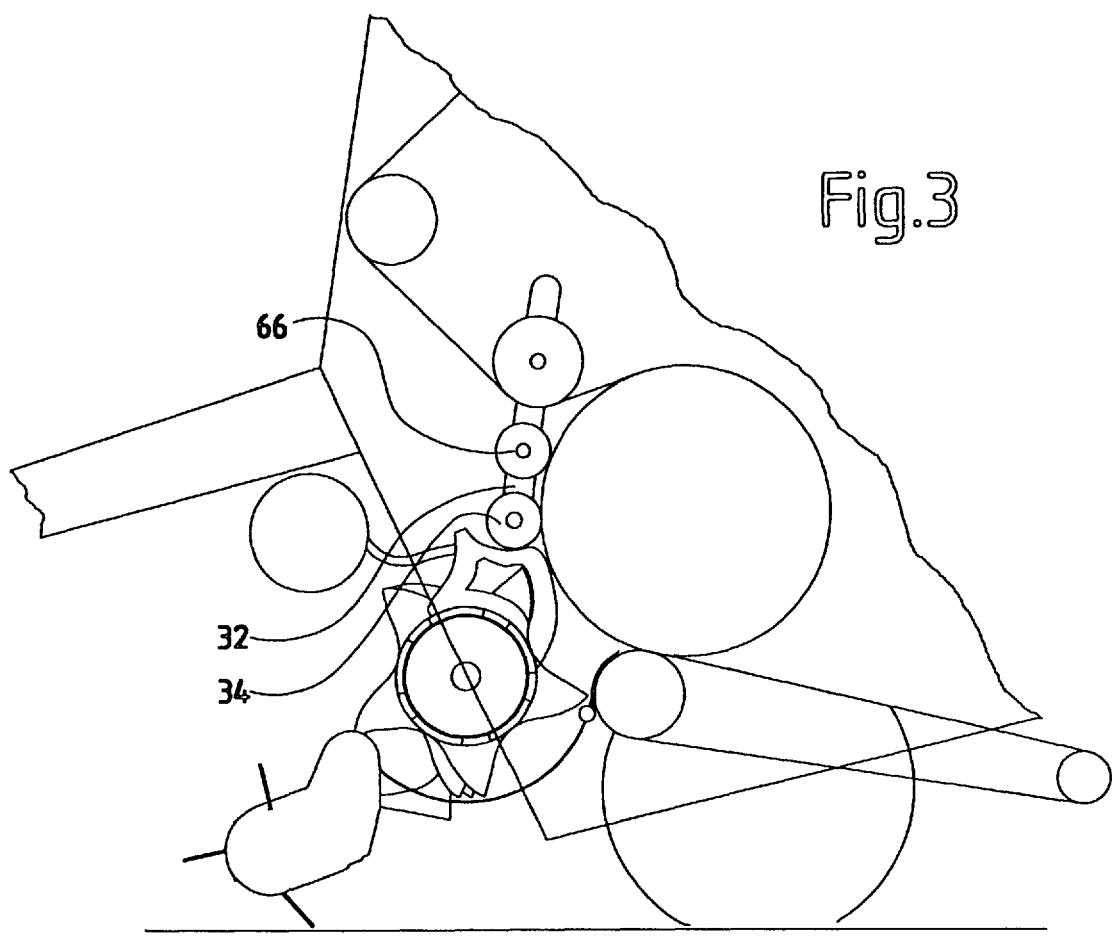
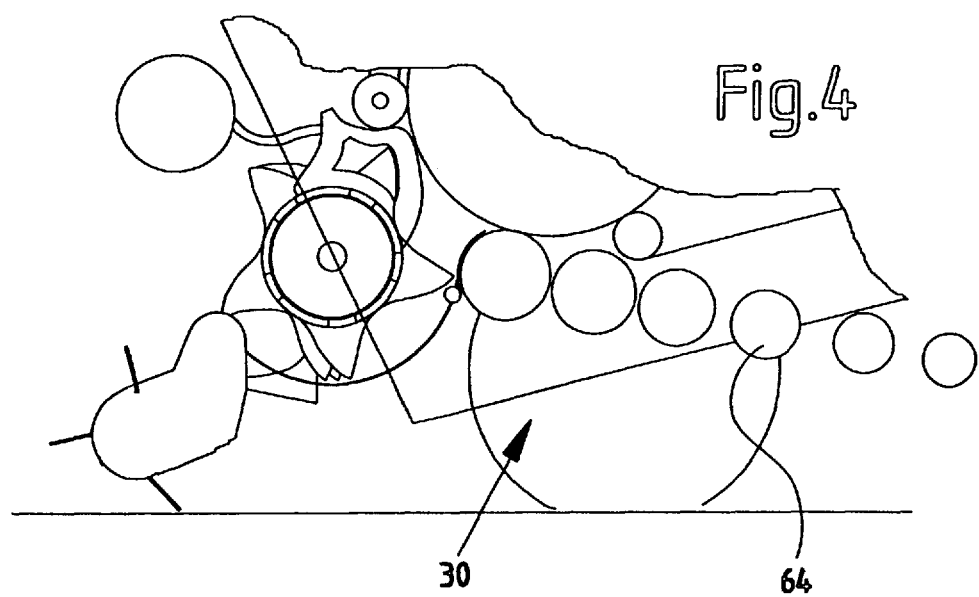

BALING CHAMBER ARRANGEMENT OF A LARGE ROUND BALER DESIGNED FOR QUICK BALE DISCHARGE

FIELD OF THE INVENTION

The invention pertains to a round baler with a frame and a cover plate attached thereto in a vertically pivoted fashion, with a baling chamber being formed in said components that is partially encompassed by a tension means that is guided over several rolls.

BACKGROUND OF THE INVENTION

DE-A1-43 08 646 discloses a round baler with a baling chamber of variable size which is formed by a frame on the front side and a housing at the rear side that is hinged so that it can be opened. A substantially vertical plane of partition results between the frame and the housing. The hinged housing is pivoted away from this plane of partition in order to allow a round bale that has been formed in the baling chamber to be ejected from the baling chamber. An axle for supporting the round baler on the ground is situated behind the plane of partition.

The above-identified German patent typifies the prior art and exhibits the drawback of requiring the housing to be swung a significant angle about its hinge joint to, and hence in requiring an excessively long time for the housing to be swung open about the hinge joint to, a position at which the round bale, which may reach a height up to 1.8 meters, can be ejected from the baling chamber and for the round baler with the raised housing to be additionally advanced without causing a collision between the housing and the round bale.

SUMMARY OF THE INVENTION

According to the present invention, there is provided an improved large round baler baling chamber arrangement.

An object of the invention is to provide a large round baler having a baling chamber defined by components which cooperate to permit a bale formed in the baling chamber to be quickly discharged.

A more specific object of the invention is to provide a large round baler including a baling chamber defined in part by cooperating opposite side walls of the main frame and of a discharge gate that is mounted for pivoting between a lowered, closed position and a raised discharge position, the respective side walls of the main frame and discharge gate meeting at a line of separation which is inclined to the rear from top to bottom to a location near the rear of the baler.

A further object of the invention is to provide a baler, as defined in the immediately preceding object and further including a bottom conveyor which serves to support the bale during its formation and which is inclined downwardly from front to rear to a location near the rear of the baler.

Yet another object of the invention is to provide a baler, as defined in one or more of the foregoing objects, wherein a lower front roll for supporting a tensioning means, that forms a further portion of the baling chamber, is mounted to a lower end of a tension arm that is pivoted such that the tension means supported by it remains in contact with a lower rear location of a bale being formed and moves to the rear as the bale grows.

These and other objects of the invention will become apparent from a reading of the ensuing description together with the appended drawings.

BRIEF DESCRIPTION OF THE DRAWINGS

FIG. 3 is a schematic, left side elevational view showing the details of a forward end of a large round baler constructed in accordance with a second embodiment, wherein a partially filled baling chamber is surrounded by a tension means and rollers that are mounted on a pivoted carrier.

FIG. 4 is a schematic, left side elevational view showing the details of a forward end of a large round baler constructed in accordance with a third embodiment, wherein the bottom conveyor is constructed of a plurality of support rolls.

DESCRIPTION OF THE PREFERRED EMBODIMENT

Figure 1:
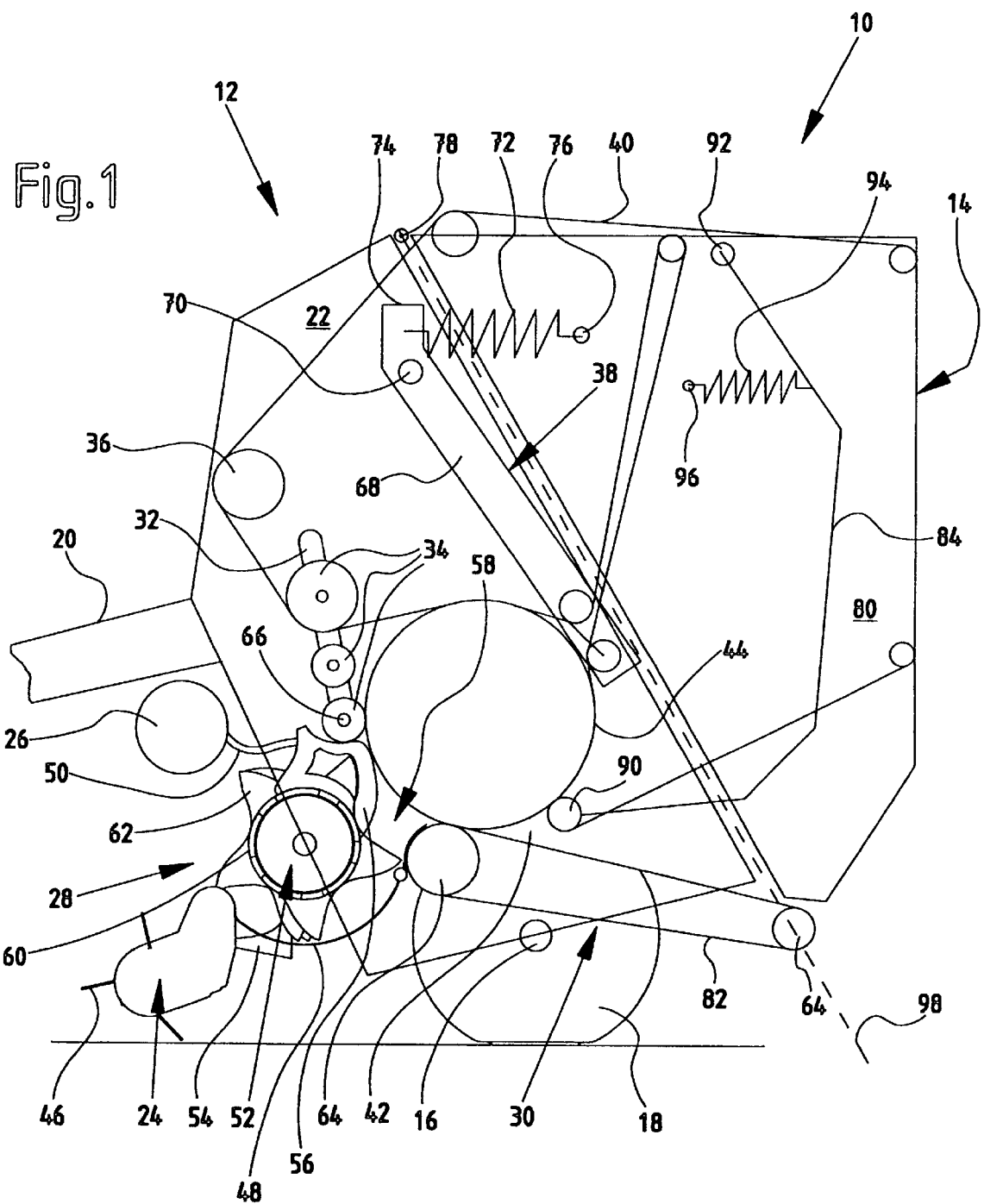
FIG. 1 is schematic, left side elevational view of a large round baler constructed in accordance with a first embodiment, wherein a partially filled baling chamber is surrounded by a tension means and stationary rollers.

Referring now to FIG. 1, there is shown a large round baler 10 including a frame 12 and a rear discharge gate 14.

The round baler 10 conventionally serves to receive a mowed crop and compress it into round bales of variable size.

The frame 12 includes an axle 16, on which are mounted wheels 18, a hitch 20 and side walls 22, with the frame carrying a pick-up 24, a conveyor 26, a cutting mechanism 28, a bottom conveyor 30 and a carrier 32 with rollers 34, rolls 36, a tensioning device 38 and tension means 40. The frame 12 is supported on the ground by the axle 16 and wheels 18 such that the round baler 10 can be towed over a field by a not-shown towing vehicle.

The hitch 20 is positively, non-positively or adjustably arranged on the frame 12 and serves to connect the round baler to the towing vehicle. The side walls 22 are rigidly mounted on the frame 12 and laterally limit a baling chamber 42 for a round bale 44.

The pick-up 24 is conventionally constructed, and may have the same or a wider width than the width of the baling chamber 42. The pick-up 24 collects the crop that lies on the ground with prongs 46 that convey in an overshot fashion, and moves the crop to a cutting mechanism 28 along a transport surface that is not illustrated in greater detail, with the crop being fed into the baling chamber from the cutting mechanism.

The conveyor 26 operates in an undershot fashion and is realized in the form of a rotor that assists in feeding the crop delivered by the pick-up 24 into the cutting mechanism 28. The conveyor 26 may have a smooth surface or be equipped with dogs, prongs, teeth, ribs, worm screws or the like. The cutting mechanism 28 customarily has a bottom 48, a cover 50, a rotor 52, knives 54 and strippers 56. The cutting mechanism 28 is not important for the invention and only is cited as a supplement to this embodiment; it is in particular, possible to omit the knives 54 such that the rotor 52 simply acts as a conveyor. If the cutting mechanism 28 is provided, it serves to comminute the crop delivered by the pick-up 24 such that it can be better compacted in the baling chamber 42.

The bottom 48 extends between the pick-up and the bottom conveyor 30, and has a curvature that essentially follows the radius of the rotor 52.

The cover 50 has the same curvature and extends between the conveyor 26 and the carrier or a roller 34 arranged on the lower end region of the carrier. The bottom 48 and the cover 50 form a receptacle opening upstream of the rotor 52 and an inlet 58 of the baling chamber 42 downstream of the rotor, with the inlet simultaneously being limited by the lower roller 34 and the bottom conveyor 30. When viewing the round baler 10 from the left, the inlet 58 is situated in the first quadrant of the rotor 52, and is consequently arranged essentially laterally to it.

The rotor 52 includes a central tube 60 and dogs 62 that are attached to the central tube 60 such that they are curved in a trailing fashion. The central tube 60 is driven in the clockwise direction, when viewing the round baler 10 from the left side, by means of a not-shown drive. The dogs 62 have an essentially triangular shape, the tip of which extends almost to the bottom 48 and the cover 50. A total of five rows of dogs 62 are welded or screwed to the central tube 60 along helical lines, with the dogs 62 being spaced apart from one another in the axial direction of the rotor 52. The diameter of the rotor 52 is of considerable size, and occupies approximately 0.6 m.

The knives 54 are realized conventionally and can preferably be locked in different positions, with the knives also being able to yield in case of an overload. The knives 54 extend into all or only a few of the intermediate spaces between the dogs 62 through slots in the bottom 48 that are not visible in the figures. The knives 54 are held by a common adjustable carrier, not illustrated in the figures, and may extend up to the central tube 60 in one end position and up to the inner edge of the bottom 48 in the other end position. As mentioned previously, the knives 54 can also be omitted such that the rotor 52 does not perform a cutting function, but rather acts only as a conveying rotor 52. The knives 54 are situated below the rotor and upstream of the inlet 58; they may, however, also be arranged above the rotor 52 if the rotor conveys in an overshot fashion.

The strippers 56 are situated downstream of the knives 54 and are also arranged in the intermediate spaces between the dogs 62. An edge of the dogs 62 that faces the baling chamber 42 extends nearly vertically and is slightly curved. The strippers 56 border the central tube 60 on the one side and the lower roller 34 on the other side, with the strippers very closely following their contours. The position of the strippers 56 is chosen such that the round bale 44 is able always to support itself on the strippers against a forwardly directed movement, with the strippers consequently covering a certain part of the inlet 58.

Figure 2:
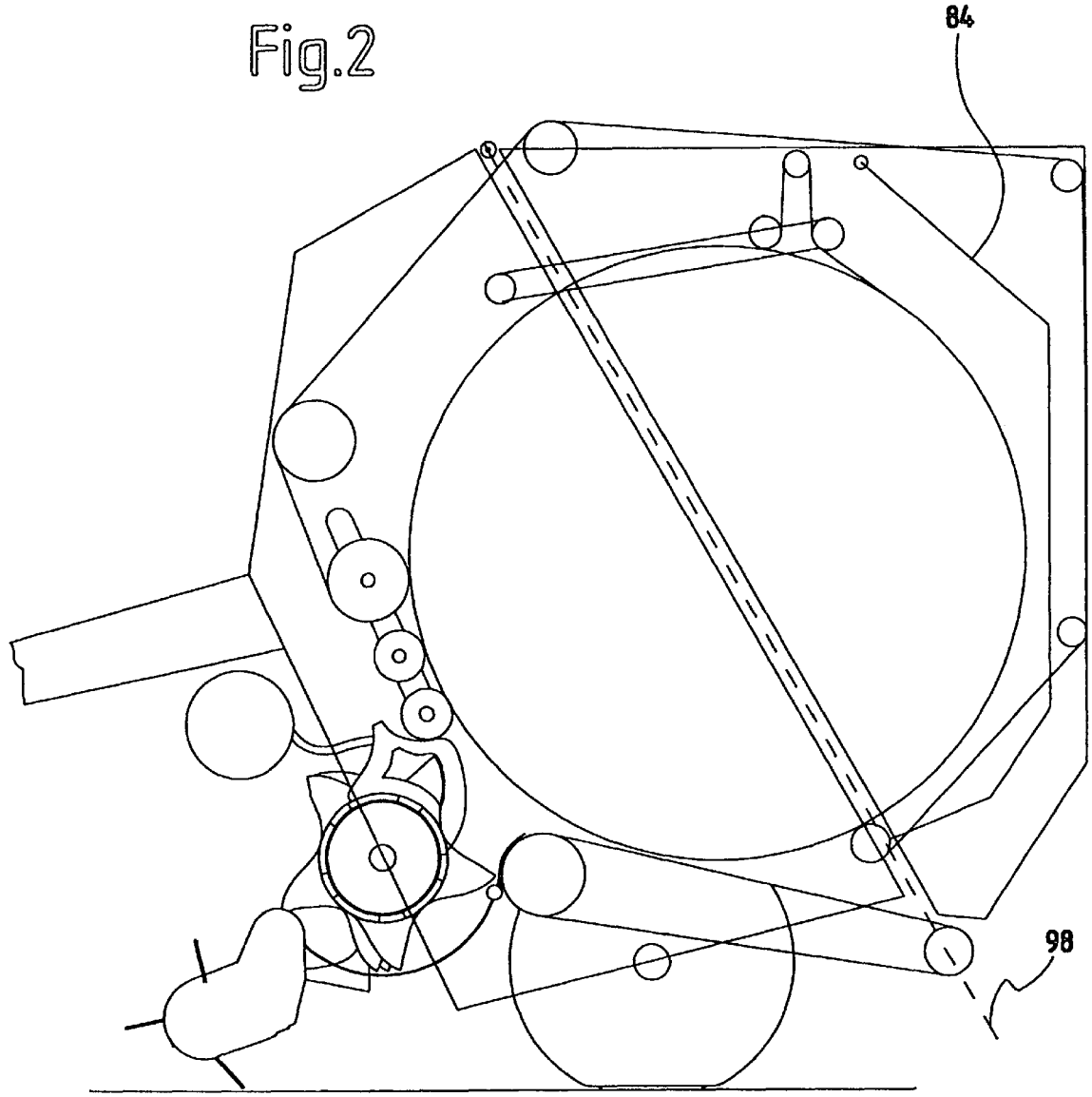
FIG. 2 is a view like that of FIG. 1 but showing a completely filled baling chamber.

The bottom conveyor 30 in the embodiment according to FIGS. 1–3 is formed by two support rolls 64 that are stationarily, rotatably mounted in the frame 12 or in its side walls 22, with a tension means 82 being looped around the support rolls. The rear support roll 64 is arranged lower than the front support roll 64, but is still situated above the axle 16. A descending transport surface is thus created on the two support rolls 64 and the tension means 82. Instead of using the two support rolls 64 and the tension means 82, it would also be conceivable to provide a larger or smaller number of support rolls, a chain conveyor, a conveyor belt or the like (see FIG. 4). The bottom conveyor 30 limits the baling chamber 42 in its lower region with part of the periphery, with said part of the periphery increasing as the size of the round bale 44 increases. The support rolls 64 are preferably driven.

The carrier 32 is realized in the form of a rail that is resistant to bending and is provided twice, namely on each side wall 22. In this case, sufficiently known reinforcing elements that, however, are not illustrated in the figures, are provided between the two carriers. In the embodiment according to FIGS. 1 and 2, the carrier 32 is realized rigidly and is slightly inclined toward the front, with the carrier according to FIG. 3 being pivoted in a vertical plane about a horizontal pivot axis 66 that extends transverse to the driving direction of the round baler 10. The pivoting axis 66 is situated between the ends of the carrier 32, and in this particular embodiment, approximately in its center such that it is able to move similarly to a rocker. In another embodiment that is not illustrated in the figures, the carrier 32 can be pivoted about a pivoting axis that coincides with the rotational axis of the lower roller 34.

Assuming three rollers 34 are provided, which, however, is not absolutely imperative, the rollers 34 consist of a lower, a central and an upper roller 34. The rollers 34 are rotatably accommodated between the two carriers 32 and extend across the entire width of the baling chamber 42. The arrangement is chosen such that the surfaces or boundaries facing the round bale 44 lie on a curved surface, with this curved surface following the diameter of the round bale 44 once the round bale 44 has essentially reached its full size. The diameters of the lower roller and the central roller 34 are smaller than the diameter of the upper roller 34. The lower roller 34 is always situated near the rear edge of the cover 50. The rotational axis of the central roller 34 also forms the pivoting axis 66. However, this is not absolutely imperative, and may be achieved differently in other embodiments. The pivoting axis 66 may, in particular, be offset toward the bottom, toward the top, toward the front or toward the rear. A gap through which the tension means 40 extends is formed between the central roller and the upper roller 34. The lower roller and the central roller 34 directly form part of the wall of the baling chamber 42, with the crop being baled therein directly acting upon said rollers. Instead of using the carrier 32 with its rollers 34, it would also be possible to provide only one roller 34 or only one deflection roller 36, around which the tension means 40 extends.

Several rolls 36, of which at least one is driven, extend between the side walls 22, and are, in part, rotatably supported in these parallel to the rollers 34. According to FIG. 1, four rolls 36 are provided about which the tension means 40 revolves in an endless fashion. Two of the four rolls 36 are stationarily supported in the side walls 22, with the other two rolls being movably supported on the tensioning device 38 such that they are able to move together with the tensioning device.

The tensioning device 38 conventionally includes an arm 68, a bearing 70 and an energy storage device 72. The arm 68 is formed by a massive steel rail or tube and provided twice, analogously to the carriers 32, i.e., in the vicinity of both side walls 22. The arm 68 extends almost over the entire length of the side wall 22 and is provided with two rolls 36 in the end region that is situated distant from the bearing 70. These two rolls are spaced apart from one another in the radial direction. These rolls 36 are situated in interior spaces that are surrounded by the tension means 40. The arm 68 extends beyond the bearing 70 in the end region that is situated near the bearing 70 and is slightly angled so as to form a lever arm 74. The bearing 70 accommodate the arm 68 in a vertically pivoting fashion at the end region situated opposite to the rolls 36. For this purpose, a separate bearing 70 may be respectively provided on each side wall 22, or one bearing may extend between the side walls 22.

The energy storage device 72 is realized in the form of a helical tension spring in this embodiment; alternatively, it would be possible to utilize a hydraulic cylinder with a gas pressure accumulator or a throttle, a different type of spring, a combination thereof or the like. The energy storage device 72 is mounted at one end to the lever arm 74 and at the other end to the holder 76, with the holder acting stationarily on the frame 12 or the side wall 22. The energy storage device 72 normally is at least slightly pre-stressed. However, it would also be possible to realize an embodiment in which the resistance of the energy storage device 72 can be varied, e.g., by means of a controllable throttle, such that a different degree of compaction is realized across the diameter of the round baler 44, so-called soft core is achieved. The effective direction of the energy storage device 72 is chosen such that the arm 68 with its rolls 36 is always pressed toward the inlet 58, i.e., in the direction of the smallest possible baling chamber 42.

The tension means 40 is conventionally formed of several narrow belts that extend parallel to one another in this embodiment. The tension means 40 represents a closed tension means and extends through the frame 12 and the discharge gate 14. It would also be conceivable to conventionally provide two separate tension means in the frame 12 and the discharge gate 14. Beginning at the front roll 36 on the arm 68, the tension means 40 runs through the gap between the upper and the central roller 34 on the carrier 32, over a lower front roll 36, an upper front roll 36 and on into the discharge gate 14 via an upper central roll, an upper rear roll, a lower rear roll, a movable roll, the rear roll on the arm 68, an upper roll 36, with the movable roll being identified by the reference symbol 90 and described in greater detail below. Due to the ability to pivot the arm 68 and the carrier 32, the section of tension means 40 which runs between the gap and the roll 36 on the arm 68 can be subjected to an excursion, and varied with respect to its size. This section represents part of the wall of the baling chamber 42, and is directly acted upon by the crop situated in the baling chamber 42.

The baling chamber 42 has a variable size and is surrounded by the inlet 58, the rollers 34 on the carrier 32, the section of the tension means 40 runs between the gap and the roll 36 on the arm 68, a tension means section between the rear roll 36 on the arm 68 and the movable roll 90, and the bottom conveyor 30. On the end faces, the baling chamber 42 is partially closed by the side walls 22.

The round bale 44 is formed of the crop that is wound up in a helical fashion and ultimately reached the size indicated in FIG. 2. In order to unload the round bale 44 from the baling chamber 42, the discharge gate 14 is raised such that the round bale 44 is able to roll along the bottom conveyor 30 and onto the ground. The density of the round bale 44 is obtained by means of the tension means 40, which is generated by the energy storage device 72.

The discharge gate 14 is connected to the frame 12 in a vertically pivoting fashion in a bearing 78, with the pivoting movement being caused by sufficiently known hydraulic cylinders that, however, are not illustrated in the figures. The discharge gate 14 has two side walls 80, the aforementioned rolls 36, a section of the endless tension means 40, two arms 84 and the movable roll 90. The side walls 80 extend in the same plane a the side walls 22 of the frame 12 and close the baling chamber 42 on its still-open end faces. Known reinforcing elements that, however, are not illustrated in the figures, extend between the side walls 80. The four rolls 36 used in this embodiment are stationarily accommodated in a rotatable fashion in the side walls 80 an extend over the entire width of the baling chamber 42, parallel to the rolls 36 in the frame 12. Each arm 84 is connected in a vertically pivoting fashion in the vicinity of the upper edge of the discharge gate 14, and approximately centrally, in bearing 92, with the arms having a trough-like or U-shaped form when viewed from the side of the round baler 10. The interior space of the arm 84 resulting from this particular shape is large enough that it can accommodate part of the circumference of the round bale 44 once it has reached its maximum size, i.e., the "trough" is open toward the front.

The arm 84 rotatably carries the roll 90 on its lower end, with the movable roll traveling along the surface of the bottom conveyor 30 as the diameter of the round bale 44 increases. The tension means 40 is guided over the movable roll 90 such that the movable roll 90 and the tension means section extending over it are always indirect or indirect contact with the round bale 44. Another energy storage device 94, which may be realized analogously to the energy storage device 72, i.e., in the form of a helical tension spring, a hydraulic cylinder with a throttle or a pressure accumulator, etc., engages the arm 84 between the bearing 92 and the movable roll 90. The energy storage device 94 is mounted, at the end that is situated distant from the arm 84, to a holder 96, with the holder being mounted on the side walls 80. The energy storage device 94 is pre-stressed in such a way that it always presses the arm 84 toward the inlet 58.

The side walls 22 and 80 abut one another in a plane of partition 98 that extends from the bearing 78 to the rear support roll 64, from the upper front toward the lower rear, with an incline of approximately 600 with reference to the horizontal.

According to the previous description, the round baler 10 of the embodiment illustrated in FIGS. 1 and 2 functions as described below.

In a not-shown situation in which the tension arm 68 is situated in its lowest position due to the effect of the energy storage device 72, the arm 84 and the movable roll 90 assume approximately the position shown in FIG 1. The sections between the upper roller 34 on the carrier 32 and the rolls 36 on the arm 38 or the movable roll on the arm 84 extend essentially from the upper front toward the lower rear in a plane inclined by approximately 45°. In this case, the baling chamber 42 assumes a nearly triangular shape, the hypotenuse of which is formed by the two aforementioned sections, with the triangle almost standing on one of its tips. The baling chamber 42 has the smallest possible volume in this instance.

At the beginning of the baling process, the round baler 10 is moved over a field on which the crop is, for example, arranged in windrows, with the crop being collected by means of the pick-up 24 and fed to the cutting mechanism 28. The rotor 52 conveys the crop into the baling chamber 42 in an under shot fashion, if applicable, past the knives 54. In the baling chamber 42, the crop comes in contact with the strands of the tension means 40 that revolve in the same direction. Due to the cooperation between the rotatable support, and optionally the drive of the support rolls 64 and the rollers 34, and the packing surface of the tension means 40, 82, the crop begins to rotate once it reaches a sufficient volume, namely in the clockwise direction in the figures. In another embodiment, the round bale 44 may also be would up in the counterclockwise direction.

As the baling process progresses, the round baler 10 reaches the operating state shown in FIG. 1, namely the operating state in which the arm 68 has been moved slightly upward against the force of the energy storage device 72 and consequently subjects the strands to an upward excursion such that they are displaced out of the common plane and assume the shape of a blunt roof. In the embodiment according to FIG. 3, the carrier 32 is slightly pivoted about the pivoting axis 66 in the counterclockwise direction, such that its lower roller 34 moves into the baling chamber 42. In this position, the round bale 44 is essentially supported on the front support roll 64 of the bottom conveyor 30.

As the baling process progresses, the round bale 44 reaches the size shown in FIG. 2. In this operating state, the arm 68 is completely pivoted upward and the energy storage device is completely tensioned, such that the highest density possible is achieved on the circumferential surface of the round bale 44. Since the bottom conveyor 30 is unable to yield and the carrier 32 with its rollers 34 is either realized stationarily or can, according to FIG. 3, pivot only to a limited degree, the round bale 44 is built up toward the top and the rear such that its circumferential region acts upon the section between the rear roll 36 on the arm 68 and the movable roll 90 or upon the movable roll 90 itself, although only indirectly. The arm 84 retreats in opposition to the force of the energy storage device 94, and starting from a position near the inlet 58, moves backward up to the plane of partition 98 and slightly into the discharge gate 14, into a position situated distant from the inlet 58. During this process, the round bale 44 is increasingly supported on the bottom conveyor 30.

In order to eject the round bale 44, the discharge gate 14 and consequently the arm 84, are raised in the counterclockwise direction in the figure such that the round bale 44 is able to roll, on the surface of the bottom conveyor 30 that is inclined toward the rear, out of the region of the baling chamber that is situated in the frame 12. It is quite obvious that an opening through which the round bale 44 can be ejected is produced more rapidly, and with a shorter adjusting distance of the discharge gate 14, due to the inclined plane of the partition 98, as well as to the fact that the movable roll 90 moves toward the rear. Both measures make it possible to attain the objective of the invention independently of one another, and can be carried out independently of one another. However, the described combination improves the respective effect. Due to the nearly triangular shape of the discharge gate 14, an interfering front edge is reduced to a minimum, and the discharge gate 14 does not have to be raised as high in order to be moved over the round bales 44 lying on the ground when the round baler 10 is advanced in order to continue the baling process.

FIGS. 3 and 4 show embodiments of the invention which largely correspond to the embodiment according to FIGS. 1 and 2, and also fulfill the same function.

The difference between the embodiment according to FIGS. 1 and 2 and the embodiment according to FIG. 3 can be see in the fact that the carrier 32 is movable about a horizontal pivot axis 66 in FIG. 3.

The difference between the embodiment according to FIGS. 1 and 2 and the embodiment according to FIG. 4 can be seen in the fact that the bottom conveyor 30 in FIG. 4 does not consist of two support rolls 64 and an endless tension means 82 that extends over these two support rolls, but rather of a series of support rolls 64 that lie parallel to one another and exhibit the same surface that descends toward the rear. This is, among other things, achieved by means of diameters that decrease toward the rear.

In a not-shown embodiment, the bottom conveyor 30 can be pivoted downward about the rotational axis of the front support roll 64 on the rear side. This can be controlled by means of a hydraulic cylinder. Consequently a third measure is made available for rapidly realizing the required opening cross section.

Having described the preferred embodiment, it will become apparent that various modifications can be made without departing from the scope of the invention as defined in the accompanying claims.

What is claimed is:

1. In a large round baler having a frame supported on ground-engaging wheels and including a first pair of transversely spaced side walls, a discharge gate including a second pair of transversely spaced side walls mounted to an upper rear location of the first pair of side walls for pivoting between a lowered operating position, wherein respective facing edges of the first and second pairs of side walls meet along a line of separation, and a raised discharge position, and a bale-forming chamber being defined in part by said first and second pairs of side walls and by a plurality of transverse bale chamber forming rolls extending between and supported by said first and second pairs of side walls, with the bale-forming chamber having a crop-receiving inlet defined at a lower front location thereof, the improvement comprising: one of said bale chamber forming rolls being a lower front roll carried by said discharge gate; and mounting structure coupled between said lower front roll and said discharge gate for guiding said lower front bale chamber forming roll from a first position close to said inlet, which it occupies when formation of a bale is just starting, to the rear as the bale grows in size, and for positioning said lower front roll such that it remains in contact with a lower rear location of a periphery of said bale during formation of said bale; and a yieldable tensioning device resisting rearward movement of said lower front roll.

2. The large round baler, as defined in claim 1, wherein said mounting structure includes a generally upright, elongate tension arm arrangement having said lower front bale chamber forming roll mounted to a lower end thereof; said tension arm arrangement having an upper end pivotally mounted to said discharge gate; and said tensioning device being coupled between said tension arm and said discharge gate.

3. The large round baler, as defined in claim 2, wherein said tension arm arrangement is shaped to define a trough which opens towards the front so as to form a space into which the bale may grow during its formation.

4. The large round baler, as defined in claim 1, wherein said mounting structure projects forwardly of said line of separation when said lower front bale chamber forming roll is in its first position.

5. The large round baler, as defined in claim 1, wherein said line of separation is inclined to the rear from top to rear.

6. The large round baler, as defined in claim 5, wherein a lower end of said line of separation terminates at a location adjacent a rear end of said baler.

7. The large round baler, as defined in claim 1, and further including a bottom conveyor mounted to said frame in a position for delimiting a lower portion of said baling chamber; said conveyor defining a bale support surface which is included downwardly from front to rear and terminates at a rear location adjacent said rear end of said baler.

8. The large baler, as defined in claim 7, wherein said conveyor includes a belt supported by front and rear support rolls, with said front support roll supporting said belt so as to delimit a lower side of said inlet.

9. The large round baler, as defined in claim 7, wherein said conveyor is defined by a plurality of conveyor rolls, with a forward one of said conveyor rolls delimiting a lower side of said inlet and with a rearward one of said conveyor rolls being located adjacent said line of separation.

10. The large round baler, as defined in claim 9, wherein said plurality of conveyor rolls respectively decline in diameter from front to rear.

11. The large round baler, as defined in claim 7, wherein said line of separation has a lower terminus adjacent a rear end of said conveyor.

12. The large round baler, as defined in claim 1, wherein said plurality of bailing chamber forming rolls includes at least two chamber forming rolls being mounted to a carrier; said carrier being pivotally mounted to, and said at least two chamber forming rolls extending between, said first pair of side walls at a location which disposes said at least two chamber forming rolls such that one of them delimits an upper boundary of said inlet; an endless tension element delimiting an upper portion of said baling chamber and being engaged with one of said at least two chamber forming rolls such that said tension element yieldably positions said at least two chamber forming rolls for respectively acting directly or through said tension element on a bail being formed in the baling chamber.

13. The large round baler, as defined in claim 12, wherein said carrier is mounted for pivoting about a location that is intermediate opposite ends of the carrier.

14. The round baler as defined in claim 12, wherein said endless tension element is also in engagement with said lower front roll.

* * * * *